United States Patent [19]

Ternes

[11] Patent Number: 4,529,303
[45] Date of Patent: Jul. 16, 1985

[54] APPARATUS FOR PRODUCING LITHOGRAPHIC PLATES

[76] Inventor: Norman A. Ternes, 387 Minnesota Ave., St. Paul, Minn. 55111

[21] Appl. No.: 500,426
[22] Filed: Jun. 2, 1983
[51] Int. Cl.³ .............................................. G03B 27/20
[52] U.S. Cl. .................................................... 355/91
[58] Field of Search ........................ 355/32, 91, 99, 78

[56] References Cited

U.S. PATENT DOCUMENTS

3,635,560  1/1972  Hulen ................................ 355/91 X

Primary Examiner—Richard A. Wintercorn
Attorney, Agent, or Firm—Merchant, Gould, Smith, Edell, Welter & Schmidt

[57] ABSTRACT

A vacuum frame is provided with a work surface with a known reference center point. Two vacuum chambers on the underside of the work surface are included for a lithographic plate and an image carrier. Vacuum motors associated with the two vacuum chambers, upon actuation, cause the lithographic plate and image carrier to be tightly drawn up against the work surface through a plurality of small apertures formed through the work surface and communicating with the vacuum chamber. A plurality of arrays of registering pins are disposed in the work surface, each array having a known relationship; to the center of the work surface. Each registering pin is adjustable to be flush with or project at selected elevations above the work surface.

15 Claims, 14 Drawing Figures

APPARATUS FOR PRODUCING LITHOGRAPHIC PLATES

TECHNICAL FIELD

The invention relates generally to lithographic printing, and is specifically to an improved apparatus for and method of producing lithographic plates for printing cylinders of printing presses.

BACKGROUND OF THE INVENTION

Lithographic printing conventionally involves the use of a printing press having one or more printing cylinders. A lithographic plate, which is typically of rectangular configuration and made from thin metal, is used for each printing cylinder. The lithographic plates are replaceably mounted on the printing cylinder, and a separate plate must be prepared for each printing cylinders for each job (usually), each lithographic plate representing one page of text and/or illustrations.

As is well known in the art, preparation of a lithographic plate involves coating with a photosensitive material, followed by exposure to light through an image (e.g., film) and development of the plate. As a result, the developed positive image attracts ink, while ink is repelled by the negative portion (the converse may also occur depending on how the image is formed).

The developed lithographic plate is then mounted on the cylinder in encircling relation and clamped tightly to its surface, and the printing process begins. A problem that has long existed in the production of lithographic plates is properly orienting the image relative to the lithographic plate prior to the exposure to light. Typically, the image must be centered on the center of the printing area of the lithographic plate. Conventionally, this has been accomplished by determining the printing area of the particular plate being used, and superimposing an image carrier over the plate with the image properly positioned relative to such printing area.

A lithographic plate must be sized and configured relative to the printing cylinder with which it is used. The size is determined by the printing cylinder circumference and axial length. The configuration involves bending the leading and trailing edges of the plate to fit clamping apparatus within the printing cylinder. The printing area is disposed between the bends formed at each end of the plate. Since the bends are generally of different configuration at each end, the printing area is not centered within the plate; i.e., the plate center and printing area centers do not coincide.

This obviously must be taken into consideration in positioning the image. The printing area center is established by measuring, and the image is then appropriately positioned relative to the printing area center. This is usually done on a working surface by measuring and then taping the image carrier in place over the lithographic plate.

Each image must be individually positioned over the associated lithographic plate, and this procedure requires considerable time. The problem is compounded in large printing operations involving multiple presses with a substantial number of printing cylinders, which often are of different size and configuration. This involves the use of lithographic plates of different size and bend configurations, and unique measuring and image placement is required for each. Consequently, the production of lithographic plates with known procedures is both time consuming and costly.

SUMMARY OF THE INVENTION

The inventive apparatus and method overcome this problem by providing one or more reference positions for the carrier or carriers of the image, and one or more reference positions for lithographic plate or plates, and relating these reference positions so that the image is automatically properly positioned on the printing area of the lithographic plate.

More particularly, a vacuum frame is provided having a work surface with a known reference center point. The vacuum frame includes two vacuum chambers on the undersurface of the work surface for the lithographic plate and image carrier, respectively. Vacuum motors are associated with the two vacuum chambers, and upon actuation cause the lithographic plate and imaqe carrier to be drawn tightly against the work surface through a plurality of small apertures formed through the work surface and communicating with the vacuum chambers.

A plurality of arrays of registering pins are disposed in the work surface, each array having a known relationship to the center of the work surface. Each registering pin in the preferred embodiment is adjustable to lie flush with the work surface, or to project at selected elevations above the work surface.

A precision punch is used to form a plurality of apertures along one edge of the lithographic plate, and also along one edge of the image carrier. The apertures in the lithographic plate are disposed in an array having a known relationship to the center of the plate printing area. The relationship is the same as the relationship of one of the arrays of registering pins to the work surface center. Both are uniquely related to the size of the associated printing cylinder.

Similarly, the precision punch forms an array of apertures in the image carrier which is the same as another of the arrays of registering pins to the work surface center.

As such, the lithographic plate can be placed on the work surface with its apertures over the registering pins of a selected array, and the respective centers of the work surface and the printing area will coincide. The image carrier can then be placed on the work surface in superimposed relation to the lithographic plate, and its center coincides with the other reference center points.

As a result, by virtue of the previously established relationship of pins, apertures and reference center points, the image of the image carrier is automatically centered or otherwise appropriately positioned on the lithographic plate without measuring or taking any other such steps.

Preferably, an array of registering pins is provided for each size of lithographic plate used in a particular printing operation. It is possible to use an image carrier of a single uniform size, which further simplifies the overall operation.

In any case, the various components are quickly and easily assembled on the vacuum frame in a previously established and accurate relation, in preparation for the exposure to light, all without the need for time-consuming measurements.

DETAILED DESCRIPTION OF THE INVENTION

Figure 1:
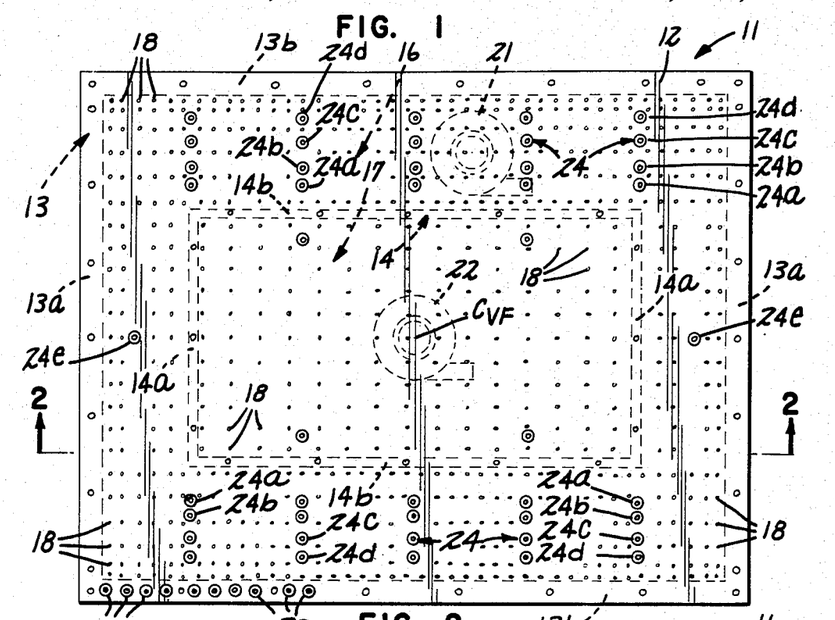
FIG. 1 is a top plan view of a vacuum frame used in producing an image on a lithographic plate embodying the inventive principles.
Figures 2, 3:
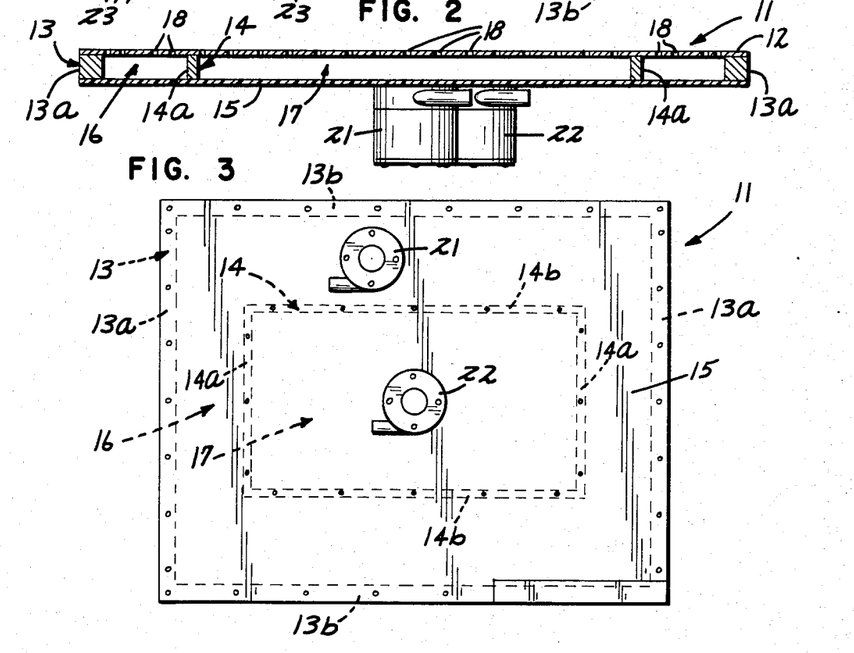
FIG. 2 is a sectional view taken along the line 2—2 of FIG. 1.
FIG. 3 is a reduced view in bottom plan of the vacuum frame.

With initial reference to FIGS. 1-3, a vacuum frame embodying the invention is represented generally by the numeral 11. Frame 11 comprises a flat, rectangular plate 12 which in the preferred embodiment is aluminum. Plate 12 is screwed to a rectangular frame having the same external dimension as the plate 12, and consisting of two ends 13a and two sides 13b of square stock (FIGS. 2 and 3).

Plate 12 is also screwed to a smaller rectangular frame formed from end members 14a and side members 14b which is centrally disposed within the frame 13. As shown in FIG. 2, the frame coponents 13a-b and 14a-b, and a second rectangular plate 15 having the same dimensions as plate 12 is screwed to these frame components from the bottom (FIGS. 2 and 3). Plate 15 may be of any suitable material which will form a satisfactory seal with the frames 13, 14. In the preferred embodiment, plate 15 is plastic.

As constructed, the two plates 12, 15 and the frames 13, 14 define first and second vacuum chambers 16, 17 (FIGS. 2 and 3). As best shown in FIG. 3, chamber 17 lies within the frame 14 and is rectangular, whereas chamber 16 lies between the frames 13, 14 and surrounds the chamber 17.

With continued reference to FIGS. 1 and 2, plate 12 is formed with a substantial plurality of apertures 18 that establish fluid communication between each of the chambers 16, 17 and the flat, upper working surface of plate 12. The apertures 18 are formed in substantially the entirety of plate 12 except where the mounting screws secure the plate 12 to the frames 13, 14. In the preferred embodiment, the apertures 18 are arranged in vertical and horizontal rows.

As shown in FIGS. 1-3, separate vacuum motors 21, 22 are secured to the bottom plate 15 for respective fluid communication with the chambers 16, 17. A plurality of toggle switches 23 are mounted along the lower edge of plate 12 (FIG. 1), and two of these switches 23 may be used to selectively operate the vacuum motors 21, 22 in a manner described below. As will be apparent, operation of the motors 21, 22 will cause a partial vacuum in the associated chambers 16, 17, and this serves to draw the sheet components described below against the flat working surface of the plate 12.

Figure 4:
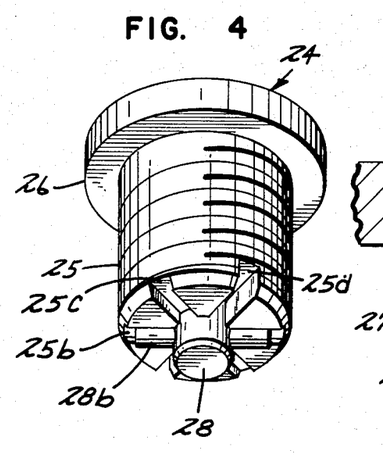
FIG. 4 is a perspective view of a multiple-position register pin used on the vacuum frame of FIGS. 1-3.
Figure 5:
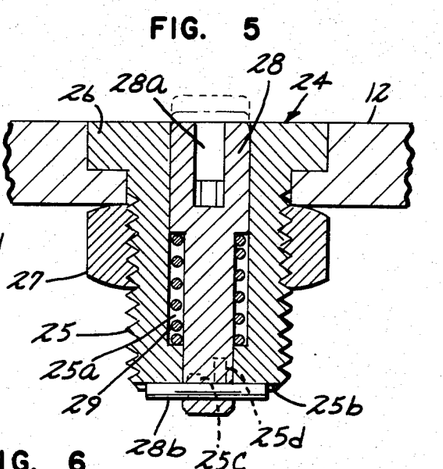
FIG. 5 is an axial sectional view of the register pin of FIG. 4 mounted to the vacuum frame.

With continued reference to FIG. 1, a plurality of retractable pins bearing the general reference numeral 24 are mounted in the plate 12. With specific reference to FIGS. 4 and 5, each of the retractable pins 24 comprises a barrel 25 the external surface of which is threaded, and the upper end of which terminates in a circular flange 26 adapted to be seated in flush relation in an appropriately sized recess within the plate 12 (FIG. 5). The barrel 25 projects below the plate 12, and a lock nut 27 secures the assembly in place.

The barrel 25 has an internal stepped circular bore 25a formed therein which receives a stepped plunger 28. A coil spring 29 is compressibly disposed between shoulders of the recess 25a and plunger 28 to normally urge the plunger 28 upwardly as shown in FIG. 5.

The upper end of plunger 28 has a cross recess 28a adapted to receive the blade of a screwdriver. The lower end of plunger 28 carries a cross pin 28b which may be selectively placed in any of three cross recesses 25b-d of different depth formed in the bottom of the barrel 25 (FIG. 4). As such, with the use of a screwdriver, the plunger 28 may be pressed downwardly against the bias of spring 29 and rotated until the cross pin 28b fits into one of the recesses 25b-d. In the full line position shown in FIG. 5, cross pin 28b is in recess 25b and the top surface of plunger 28 is flush with the surface of plate 12. With the cross pin 28b in the recess 25c, the plunger 28 is in the broken dash position of FIG. 5, in which it projects above the flat working surface of plate 12 by an amount which generally corresponds with the thickness of a lithographic plate as discussed below.

With the cross pin in recess 25d, plunger 28 projects above the plate 12 in the manner represented by the broken line in FIG. 5, which is equivalent to at least the thickness of a lithographic plate and image carrier, as discussed below.

Returning to FIG. 1, it will be seen that the pins 24 are disposed in several arrays 24a-24e, each of which in the preferred embodiment defines a straight line. Each of the arrays 24a-24d comprises a straight horizontal row of five retractable pins, and the array 24e comprises a horizontal row of two retractable pins. Each of the arrays 24a-24e has a predetermined position relationship with a reference point $C_{VF}$, which in the preferred embodiment is the center of the vacuum frame. This position relationship is discussed in further detail below in connection with the printing cylinder, lithographic plate and image carrier.

The arrays 24a-24d are shown as horizontal rows above the reference point $C_{VF}$ in FIG. 1. These rows of retractable pins 24 are symmetrically repeated along the bottom edge of the plate 12 as shown in FIG. 1. In other embodiments, the lower rows of retractable pins 24 may be arranged in arrays having a different position relationship with the reference point $C_{VF}$.

Figure 6:
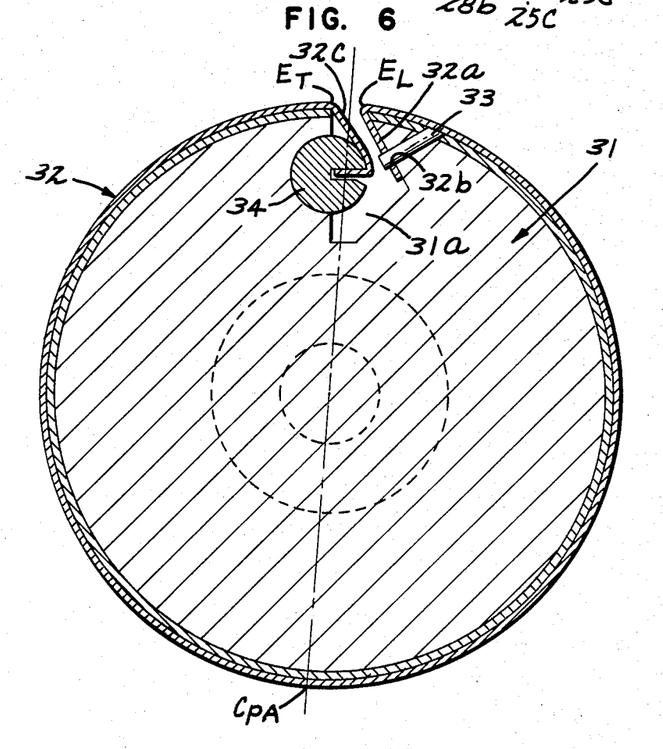
FIG. 6 is a somewhat schematic end sectional view of a printing cylinder with a lithographic plate mounted thereto.

With reference to FIG. 6, a substantially solid printing cylinder is represented generally by the numeral 31. An irregular recess 31a is formed in the exposed surface of the cylinder 31 and extends axially over all or a substantial part of the printing cylinder 31.

A lithographic plate 32 (typically formed from thin metal) wraps around the printing cylinder 31, and its ends are disposed and retained within the recess 31a. The retaining means conventionally comprise a plurality of pins 33 for one end of the lithographic plate 32, and a reel rod 34 disposed in opposition to the pins 33. As shown in FIG. 6, the lead end 32a of lithographic plate 32 is bent back and includes a plurality of punched holes 32b enabling it to fit over the retaining pins 33. The opposite or tail end 32c of the lithographic plate 32 is formed with an irregular bend permitting it to be inserted into the retaining slot of reel rod 34. Reel rod 34 can then be rotated to tighten the lithographic plate 32 against the outer cylindrical surface of printing cylinder 31.

It will be appreciated that, due to the gap created by recess 31a, the printing cylinder has an effective printing area extending from a leading edge $E_L$ on the lithographic plate 32 to a trailing edge $E_T$. This printing area has a center $C_{PA}$, which is unique to the lithographic plate 32 and its relationship to the printing cylinder 31.

Figures 7, 8A:
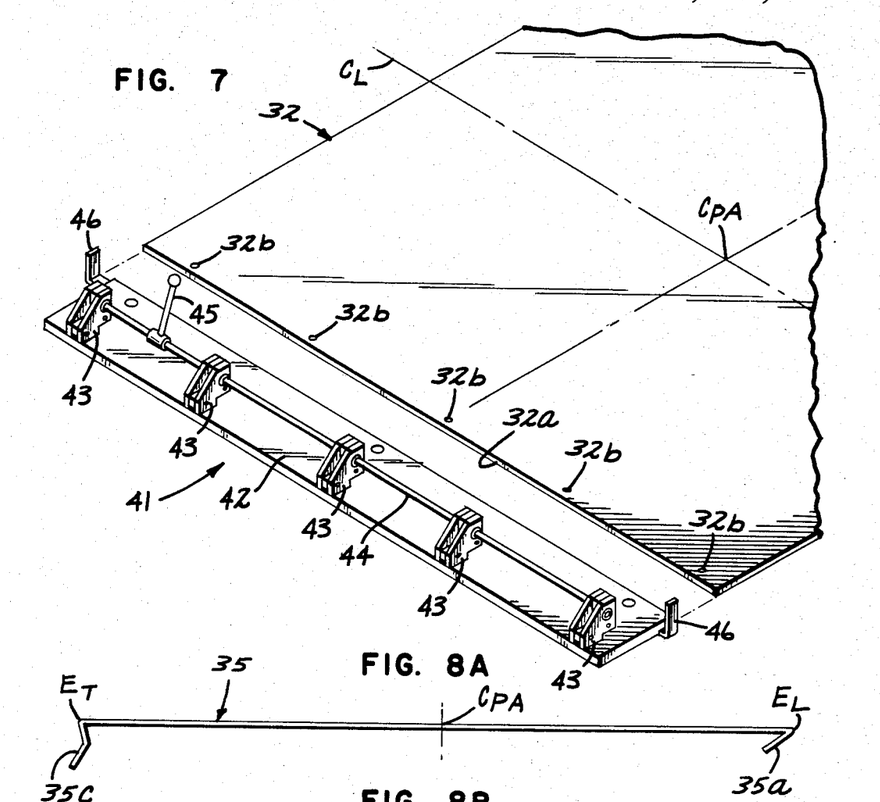
FIG. 7 is a perspective view of a multiple punch and a lithographic plate in which a plurality of apertures have been punched.
FIGS. 8A-8C are edge views of lithographic plates bent into different configurations for different printing cylinders.
Figure 8B:
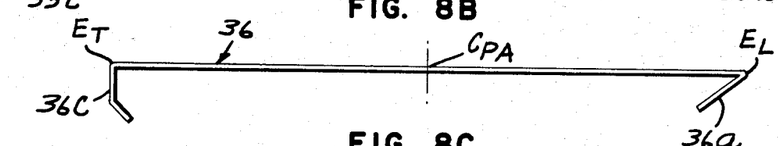
Figure 8C:
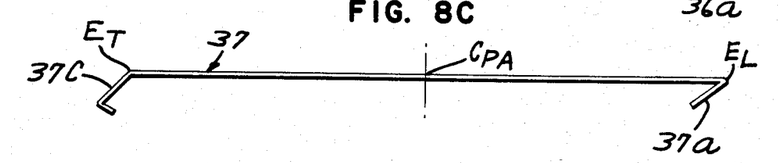

FIGS. 8A-8C show lithographic plates 35-37, respectively, each of which has a different bending configuration at the lead and tail ends which is unique to the associated printing cylinder. As such, each of the lithographic plates 35-37 as a different lead edge $E_L$, a different tail edge $E_T$, a printing area of different size, and a printing area center $C_{PA}$ which is disposed at varying distances from the leading and trailing edges $E_L$ and $E_T$. It is essential, however, that the image printed by each of the lithographic plates 35-37 be positioned (centered, preferably) relative to the center $C_{PA}$, even though the printing areas themselves are of different size. If the image to be placed on any of the lithographic plates 35-37 is not appropriately positioned, the image may extend past the leading or trailing edges of the printing area, in which case part of the image will not be printed.

With reference to FIG. 7, a precision punch for accurately forming apertures in lithographic plates and image carriers is represented generally by the numeral 41. Punch 41 comprises a baseplate 42 and a plurality of individual punching mechanisms 43 commonly actuated by a shaft 44 with a handle 45. Guides 46 are disposed at each end of the baseplate 42 to align the article to be punched properly.

The individual punching mechanisms 43 are disposed in predetermined spaced relation to each other, and in the preferred embodiment are equidistant. As disposed in the preferred embodiment, the punching mechanisms 43 punch a plurality of apertures 32b equidistantly from the lead end 32a of lithographic plate 32. The apertures 32b are thus disposed in a straight line array which is also equidistant from the center line $C_L$ of the as yet undefined printing area of the plate 32. As such, the array of apertures 32b have a predetermined relation to the printing area center $C_{PA}$. This relationship is identical to the relationship between one of the arrays 24a-24d and the vacuum frame center $C_{VF}$. Accordingly, when the lithographic plate 32 (which is uniquely sized to fit on the printing cylinder 31) is placed on a selected one of the arrays 24a-24d of pins, the printing area center $C_{PA}$ will coincide with the vacuum frame center $C_{VF}$.

Figure 9:
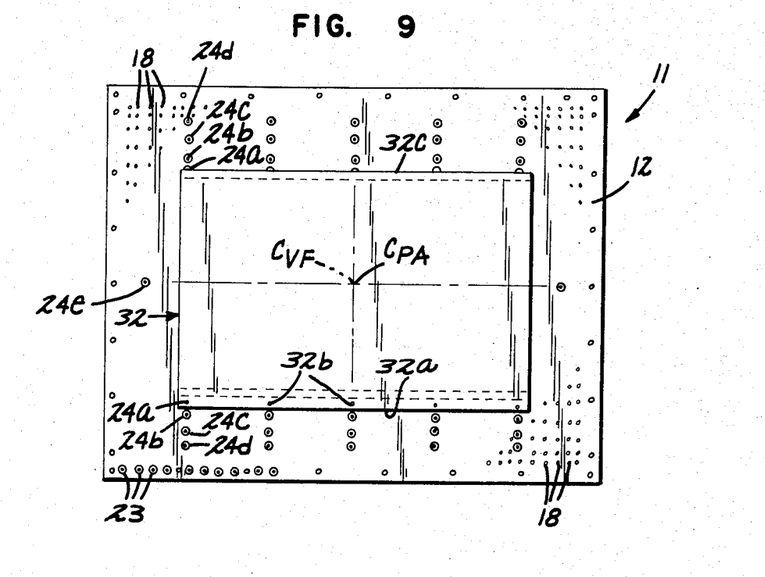
FIG. 9 is a view in top plan of a vacuum frame with a lithographic plate mounted in an exposure position.

With reference to FIG. 9, it will be seen that the array 24a of registering pins on the work surface plate 12 bears the same relation to the vacuum frame center $C_{VF}$ as the relation of the array of punched holes 32b to the printing area center $C_{PA}$ of the lithographic plate 32. Consequently, the point $C_{PA}$ coincides with the point $C_{VF}$.

It will be understood that lithographic plates of different size will have printing areas of different size, and that other arrays of the registering pins 24 would be selected in order for the printing area center to coincide with the center reference point $C_{VF}$ of the vacuum frame.

It will also be appreciated that the selected array of registering pins 24 must be adjusted to project above the working surface of plate 12 an amount corresponding to the thickness of the lithographic plate, as discussed in connection with FIGS. 4 and 5. The tops of the plungers 28 of the selected registering pins 24 will therefore be substantially flush with the top surface of the lithographic plate, and will not obstruct the superimposed image carrier as discussed below.

With the arrays 24a-24d symmetrically disposed on each side of the vacuum frame center $C_{VF}$, the lithographic plate 32 may be placed on either of two arrays bearing the same relationship to the point $C_{VF}$, and the coincidence of the points $C_{PA}$ and $C_{VF}$ will be maintained.

Figure 10:
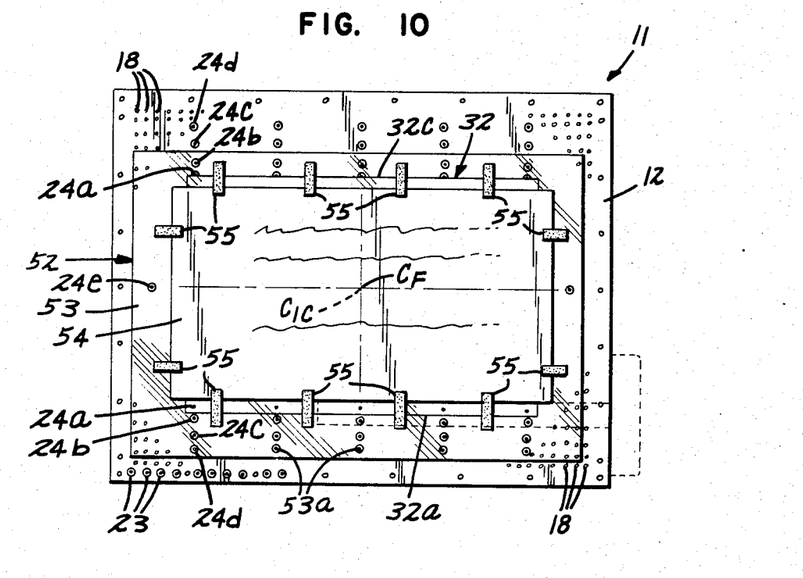
FIG. 10 is a top plan view of a vacuum frame with a lithographic plate, transparent carrier and film in an assembled position for light exposure.

With reference to FIG. 10, an image carrier bearing the general reference numeral 52 is shown superimposed over the lithographic plate 32. The term "image carrier" as used here broadly refers to a single sheet or a composite having at least one dimension which is greater than a corresponding dimension of the lithographic plate 32 for superimposition thereover, and which carries an image which may be exposed to the underlying lithographic plate 32 by the incidence of light.

In FIG. 10, the image carrier 52 comprises a sheet of transparent material 53 and a layer of film 54 which embodies a suitable image as shown.

The transparent sheet 53 is rectangular in shape, and both the length and width are greater than the corresponding dimensions of the lithographic plate 32.

A plurality of apertures 53a are formed along the lower edge of the transparent sheet 53. The precision punch 41 is used in forming the apertures 53a, and the resulting array is therefore a straight line row having a predetermined space relationship with a center reference point $C_{IC}$. This relationship is chosen to correspond identically to the relationship between one of the arrays 24a-24d and the center reference point $C_{VF}$ of the vacuum frame. Accordingly, the transparent sheet 53 may be placed on a selected one of the arrays 24a-24d of registering pins, and the center reference point $C_{IC}$ will coincide with the center reference points $C_{VF}$ and $C_{PA}$. In the embodiment shown in FIG. 10, the array 24d brings about this result.

The layer of film 54 is also rectangular in shape, but is sufficiently small that none of its edges will reach any of the arrays 24a-e. It is this lack of size that necessitates the transparent sheet 53. The layer of film 54 is thus taped onto the transparent sheet 53 with segments of tape 55 in a position so that the center of the film $C_F$ will coincide with the other center reference points. In this position, the image carried within the film layer 54 will be superimposed on the printing area of the lithographic plate 32 in a centered manner.

Figure 11:
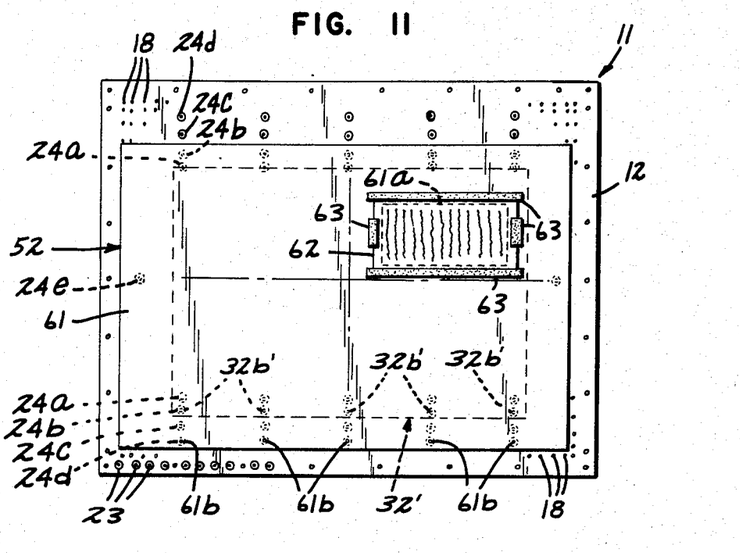
FIG. 11 is a top plan view of a vacuum frame, lithographic plate, opaque mask and image-bearing film in assembled relation for light exposure.

In FIG. 11, a lithographic plate 32' having the same width but a greater length than the lithographic plate 32 is shown. Apertures 32b' are punched along its lower edge with the precision punch 41, defining a straight line array as before. However, because of the additional length of the plate 32', the space relationship between the holes 32b' and the printing area center is different. Accordingly, the array 24b of registering pins is selected, such array having the same spatial relationship to the vacuum frame center $C_{VF}$.

The image carrier 52 in FIG. 11 comprises an opaque mask 61 of Mylar or a similar suitable material which is of the same size as the transparent sheet 53. The precision punch 41 is used to form a row of apertures 61b along the lower edge, and the array 24d of registering pins is selected to center the mask on the vacuum frame 11.

In the embodiment of FIG. 11, the image carrier 52 further comprises a smaller rectangular layer of film 62 which is not centered, but rather positioned within the upper right-hand quadrant of the mask 61. The image on film 62 is exposed to the underlying lithographic plate 32' by cutting out a rectangular opening 61a that is slightly smaller than the film 62. The film 62 is taped over the opening 61a with lengths of tape 63.

Figure 12:
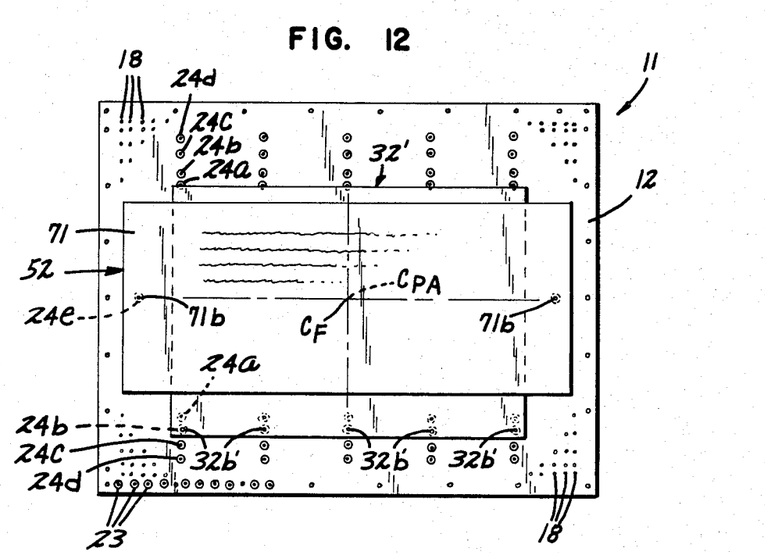
FIG. 12 is a view in top plan of a vacuum frame, lithographic plate and image-carrying film in assembled relation for light exposure.

In the embodiment of FIG. 12, a lithographic plate 32' is centered on the vacuum frame 11 by placing its array of apertures 32b' over the corresponding array 24b of registering pins, as in FIG. 11. In this case, however, the image carrier 52 comprises a large layer of film 71 which is superimposed over the lithographic plate 32'. The height of the film layer 71 is insufficient to reach any of the arrays 24a-d of registering pins while remaining in a center position, and the optional array 24e of registering pins is therefore used. Corresponding apertures 71b are formed in each side of film 71 in a position which registers with the pins 24e as well as centers the film 71 of the vacuum frame 11. It will be noted that the side-to-side line of symmetry of the film layer 71 passes through both the apertures 71b as well as the center of the film $C_F$. As positioned, the film layer 71 is centered on the printing area of the lithographic plate 32' so that its exposure will result in a properly aligned and registered image on the printing area of lithographic plate 32'.

It will be apparent from the foregoing that the position of each of the arrays 24a-e must first be established within the vacuum frame 11 as a function of the particular printing cylinders and associated lithographic plate to be used therewith. The size and type of printing cylinder determines the size of the lithographic plate to be used and the nature of the bends to be formed in the lead and tail ends of the plate. The type of bends in turn determines the size of the plate printing area as well as its center. With this unique knowledge in mind, an array of registering pins can be disposed in the plate 12 having a predetermined relationship to the center of the vacuum frame 11. This relationship is chosen to be the same as the relationship of the array of apertures along one edge of the lithographic plate to the center of its printing area.

If two or three different sized printing cylinders are used in a given printing operation, a like number of registering pin arrays must be disposed in the vacuum frame 11, enabling it to be used to prepare lithographic plates for all three cylinders.

In addition, an array for each size of image carrier must also be included, which array is also related to the vacuum frame center $C_{VF}$. Obviously, if some degree of uniformity is maintained in the size of the image carrier, the number of arrays of registering pins can be kept to a minimum.

Assuming that a single size of image carrier is used in a particular printing operation, it will be appreciated that it can be placed over any number of lithographic plates of differing sizes, printing areas and centers to the extent an array of registering pins is included on the vacuum frame 11 for each lithographic plate.

In operation, a lithographic plate of predetermined size (e.g., lithographic plate 32) having a light-sensitive coating over its printing area is selected for use on the vacuum frame 11. The plate 32 will ultimately be used in connection with a printing cylinder of corresponding size, such as the printing cylinder 31 in FIG. 6, and its printing area and printing area center are both known.

Lithographic plate 32 is flat at the time the image-producing method begins, which enables it to lie flat on the work plate 12.

The initial step is to form an array of punched holes 32b in the leading or trailing edge of the plate 32, and this is accomplished with the precision punch 41 as shown in FIG. 7. As discussed above, this array has a predetermined relation to the printing area center $C_{PA}$, and the holes 32b themselves correspond in size, number and location to the arrays 24a-d of registering pins.

The next step is to select the array of the group 24a-d which has the same relationship to the vacuum frame center $C_{VF}$ as the array of apertures 32b to the center $C_{PA}$. As discussed in connection with FIG. 9, array 24a has this position relationship. As such, the lithographic plate 32 is placed on the work plate 12 with the apertures 32b over the registering pins 24a, with the result that the centers $C_{PA}$ and $C_{VF}$ coincide. The appropriate toggle switch 23 may at this time be switched to actuate the vacuum motor 22 to create a partial vacuum in chamber 17, which draws the plate 32 against the top surface of workplate 12 through the apertures 18.

Operation of the vacuum motor 22 may alternatively be deferred until all of the components are assembled.

An image carrier 52 is now selected based on the type of exposure to be made and the nature of the medium in which the image is embodied. Assuming that the image is in a layer of film 54 as shown in FIG. 10, the transparent sheet 53 having a known center $C_{IC}$ will be chosen. The film layer 54 will be taped so that its center $C_F$ corresponds to the center $C_{IC}$ as shown in FIG. 10. Next, an array of apertures 53a will be punched along the lower edge of the sheet 53 with the precision punch 41. As discussed above, this array of apertures 53a has a predetermined relationship to the center $C_{IC}$.

An array 24a-d having the same relationship to the vacuum frame center $C_{VF}$ is now selected, and each of the registering pins 24 in this array is raised so that the associated plunger 28 is at the uppermost position as shown in FIG. 5. In this position, the plungers 28 compensate for the thickness of the lithographic plate 32 over which the image carrier 52 will be superimposed.

Based on the parameters of the layer 53, including the position of apertures 53a, the array 24d is selected. The image carrier 52 is now placed in a superimposing relation to the lithographic plate 32, and by reason of the aperture/pin relationship to the associated centers, the reference or center points $C_{IC}$ and $C_F$ now coincide with the reference points or centers $C_{PA}$ and $C_{VF}$.

At this time, the second vacuum motor 21 is actuated, so that the entire assembly is drawn tightly against the top surface of work plate 12 in this precisely registered position. As such, the image embodied in the film layer 54 is precisely placed over the printing area of the lithographic plate 32.

The assembly may now be exposed to light in a conventional manner, and the various components disassembled. The image projected onto the printing area of lithographic plate 32 may then be developed as is known in the art.

The lead and tail ends of the lithographic plate 32 must now be bent into the configuration necessary to permit mounting on the associated printing cylinder 31, and this unique configuration is shown in FIG. 6. Such bending may be efficiently carried out with the apparatus and method disclosed in my copending application Ser. No. 367,255, filed April 12, 1982, and entitled "Apparatus for Shaping Printing Plates".

The lithographic plate 32 may now be mounted on the printing cylinder 31, and the printing process itself may begin.

Assuming that the same image on a film layer 54 is to be placed in proper register on a lithographic plate other than plate 32, this is easily accomplished in the same manner as described above, with the exception that an array of the arrays 24a–d must be selected so that the printing area center of a different sized lithographic plate will correspond to the vacuum frame center. All of the steps are the same, and it will be appreciated that all measuring and related positioning of components to the assembly is obviated entirely.

It will be appreciated that the inventive apparatus and method may be used to quickly, efficiently and economically produce images on lithographic plates in various sizes with image carriers of different sizes and configurations.

What is claimed is:

1. Apparatus for use with an image carrier of predetermined size and having a predetermined reference point thereon for producing an image-carrying lithographic plate or the like of predetermined size and having a printing area with a predetermined reference point thereon, comprising:

plate means defining a substantially flat work surface, said work surface having a predeermined reference point;

first locater means for holding the lithographic plate on said work surface with the reference point of its printing area coincident with the reference point of the plate means;

second locater means for holding the image carrier on said work surface in superimposed relation to the lithographic plate with its reference point coincident with said other reference points;

first vacuum means for drawing the lithographic plate to said work surface; and second vacuum means separate from the first vacuum means for drawing the image carrier to said work surface in said superimposed relation to the lithographic plate.

2. The apparatus defined by claim 1, wherein:

the first locater means comprises a plurality of registering pin means carried by the plate means and projecting upwardly of said work surface, the first plurality of pin means being disposed in an array having a predetermined spatial relationship with the reference point of the plate means, said array being arranged so that the lithographic plate will be received and held by the pin means on said work surface with the reference point of said printing area coincident with the reference point of the plate means; and the second locater means comprises a second plurality of registering pin means carried by the plate means for projection upwardly of said work surface, the second plurality of pin means being disposed in an array having a predetermined spatial relationship with the reference point of the plate means, said array being arranged so that the image carrier will be received and held by the pin means on said work surface over said lithographic plate with the reference point of the image carrier coincident with said other reference points.

3. Apparatus for use with an image carrier of predetermined size and having a predetermined reference point thereon for producing an image-carrying lithographic plate or the like of predetermined size and having a printing area with a predetermined reference point thereon, comprising:

plate means defining a substantially flat work surface, said work surface having a predetermined reference point;

first locater means for holding the lithographic plate on said work surface with the reference point of its printing area coincident with the reference point of the plate means, and comprising a plurality of registering pin means carried by the Plate means and projecting upwardly of said work surface, the first plurality of pin means being disposed in an array having a predetermined spatial relationship with the reference point of the plate means, said array being arranged so that the lithographic plate will be received and held by the pin means on said work surface with the reference point of said printing area coincident with the reference point of the plate means; and second locater means for holding the image carrier on said work surface in superimposed relation to the lithographic plate with its reference point coincident with said other reference points, and comprising a second plurality of registering pin means carried by the plate means for projection upwardly of said work surface, the second plurality of pin means being disposed in an array having a predetermined spatial relationship with the reference point of the plate means, said array being arranged so that the image carrier will be received and held by the pin means on said work surface over said lithographic plate with the reference point of the image carrier coincident with said other reference points;

each of the registering pin means of the first and second locater means comprising a plunger pin and adjustable means associated with the work surface for holding the pin in a plurality of positions.

4. The apparatus defined by claim 3, wherein the adjustable means is constructed and arranged to hold the associated plunger pin in a first position flush with the work surface, a second position elevated from the work surface an amount generally corresponding to the thickness of the lithographic plate, and a third position elevated above the work surface an amount corresponding to at least the combination of thicknesses of the lithographic plate and image carrier.

5. Apparatus for use with an image carrier of predetermined size and having a predetermined reference point thereon for producing an image-carrying lithographic plate or the like of predetermined size and having a printing area with a predetermined reference point thereon, comprising:

plate means defining a substantially flat work surface, said work surface having a predetermined reference point;

first locater means for holding the lithographic plate on said work surface with the reference point of its printing area coincident with the reference point of the plate means, and comprising a plurality of registering pin means carried by the plate means and projecting upwardly of said work surface, a first plurality of pin means being disposed in a plurality of arrays each having a predetermined spatial relationship with the reference point of the plate means, each said array being arranged so that the lithographic plate will be received and held by the pin means on said work surface with the reference point of said printing area coincident with the reference point of the plate means; and second locater means for holding the image carrier on said work surface in superimposed relation to the lithographic plate with its reference point coincident with said other reference points, and comprising a second plurality of registering pin means carried by the plate means for projection upwardly of said work surface, the second plurality of pin means being disposed in a plurality of arrays each having a predetermined spatial relationship with the reference point of the plate means, each said array being arranged so that the image carrier will be received and held by the pin means on said work surface over said lithographic plate with the reference point of the image carrier coincident with said other reference points.

6. The apparatus defined by claim 5, which further comprises vacuum means for drawing the lithographic plate and image carrier to the work surface.

7. The apparatus defined by claim 6, wherein each of said arrays defines a straight line.

8. Vacuum frame apparatus for use with an image carrier of predetermined size and thickness and having a predetermined reference point thereon for producing an image carrying lithographic plate of predetermined size and thickness and having a printing area and predetermined reference point thereon, comprising:

plate means defining a substantially flat work surface and an undersurface, said work surface having a predetermined reference point thereon;

means on said undersurface defining a first vacuum chamber for the lithographic plate and a second vacuum chamber for the image carrier, the second vacuum chamber having a larger outside dimension than the first vacuum chamber and surrounding the first vacuum chamber at least in part;

aperture means formed in the plate means establishing fluid communication between each of the first and second vacuum chambers and said work surface;

first vacuum means for creating at least a partial vacuum in said first vacuum chamber;

second vacuum means for creating at least a partial vacuum in said second vacuum chamber;

a first plurality of registering pin means carried by the plate means and projecting upwardly of said work surface, the first plurality of pin means being disposed in an array having a predetermined spatial relationship with the reference point of the plate means, said array being arranged so that a lithographic plate will be received and held by the pin means on said work surface with the reference point of the printing area coincident with the reference point of the plate means; and a second plurality of registering pin means carried by the plate means for projecting upwardly of said work surface, the second plurality of pin means being disposed in an array having a predetermined spatial relationship with the reference point of said plate means, said array being arranged so that an image carrier will be received and held by the pin means on said work surface over said lithographic plate with the reference point of the image carrier coincident with said other reference points.

9. The apparatus defined by claim 8, wherein each of said registering pin means comprises a plunger pin and adjustable means for holding the pin in a plurality of positions, a first position being flush with the work surface, a second position being elevated from the work surface an amount generally corresponding to the thickness of the lithographic plate, and a third position being elevated above the work surface an amount corresponding to at least the combination of thicknesses of the lithographic plate and image carrier.

10. The apparatus defined by claim 8, wherein each of said arrays defines a straight line.

11. The apparatus defined by claim 8, wherein each of said reference points comprises a center.

12. The apparatus defined by claim 8, which further comprises additional pluralities of registering pin means each of which is carried by the plate means and projects upwardly of said work surface, and each of which is disposed in an array having a predetermined spatial relationship with the reference point of the plate means.

13. The apparatus defined by claim 12, wherein each plurality of registering pin means is disposed in a straight row, said rows being parallel.

14. The apparatus defined by claim 8, wherein the plate means and first and second vacuum chambers are rectangular.

15. The apparatus defined by claim 14, wherein the second vacuum chamber completely surrounds the first vacuum chamber.

* * * * *

UNITED STATES PATENT AND TRADEMARK OFFICE
CERTIFICATE OF CORRECTION

PATENT NO. : 4,529,303

DATED : July 16, 1985

INVENTOR(S) : Norman A. Ternes

It is certified that error appears in the above-identified patent and that said Letters Patent is hereby corrected as shown below:

Column 1, line 22, between the word "coating" and the word "with" insert the word --it--.

Column 1, lines 30 and 31, the words "A problem that has long..." should begin a new paragraph.

Column 1, line 46, before the word "clamping" insert the word --into--.

Column 2, line 20, change the word "imaqe" to the word --image--.

Column 10, line 30, the word "Plate" should be --plate--.

Signed and Sealed this

Third Day of December 1985

[SEAL]

Attest:

Attesting Officer

DONALD J. QUIGG

Commissioner of Patents and Trademarks